(12) United States Patent
Driessen

(10) Patent No.: US 6,760,593 B1
(45) Date of Patent: *Jul. 6, 2004

(54) CELLULAR COMMUNICATION SYSTEM WITH VIRTUAL ANTENNAS

(75) Inventor: Peter Frank Driessen, Highlands, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,243

(22) Filed: Mar. 13, 2000

Related U.S. Application Data

(63) Continuation-in-part of application No. 08/790,840, filed on Jan. 30, 1997, now Pat. No. 6,052,599.

(51) Int. Cl.[7] ................................................. H04Q 7/20
(52) U.S. Cl. ..................... 455/500; 455/447; 455/562.1
(58) Field of Search ................................. 455/500, 561, 455/562.1, 443, 444, 446, 447, 454, 422, 524, 61, 59, 522.1; 370/310, 328, 334, 345, 329, 330

(56) References Cited

U.S. PATENT DOCUMENTS 6,052,599 A  *  4/2000  Driessen ...................... 455/500

* cited by examiner

*Primary Examiner*—Jean Gelin

(57) ABSTRACT

In a cellular communication network, capacity in a cell is increased by placing antennas transmitting different signals on the same carrier frequency at separated signal transmission and virtual site locations in the cell, rather than at the center of the cell. A receiver includes multiple antennas using spatial diversity, such as beamforming and cancellation, to extract the desired signal.

29 Claims, 12 Drawing Sheets

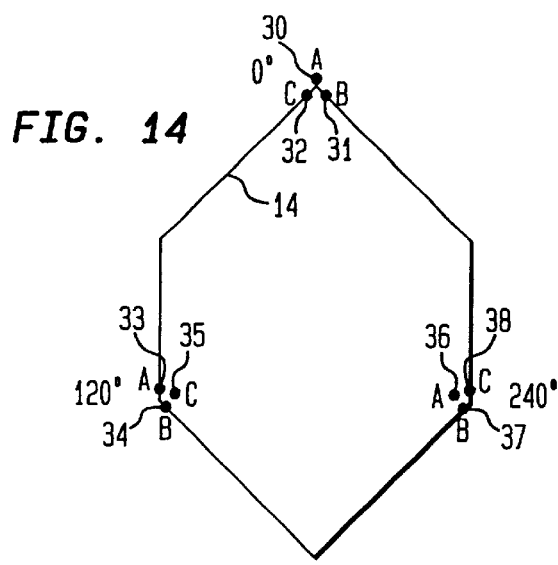
FIG. 14
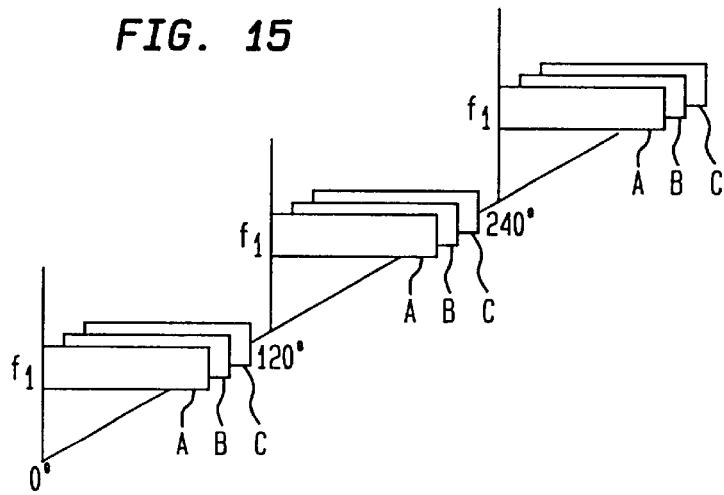
FIG. 15
FIG. 16A
FIG. 16B
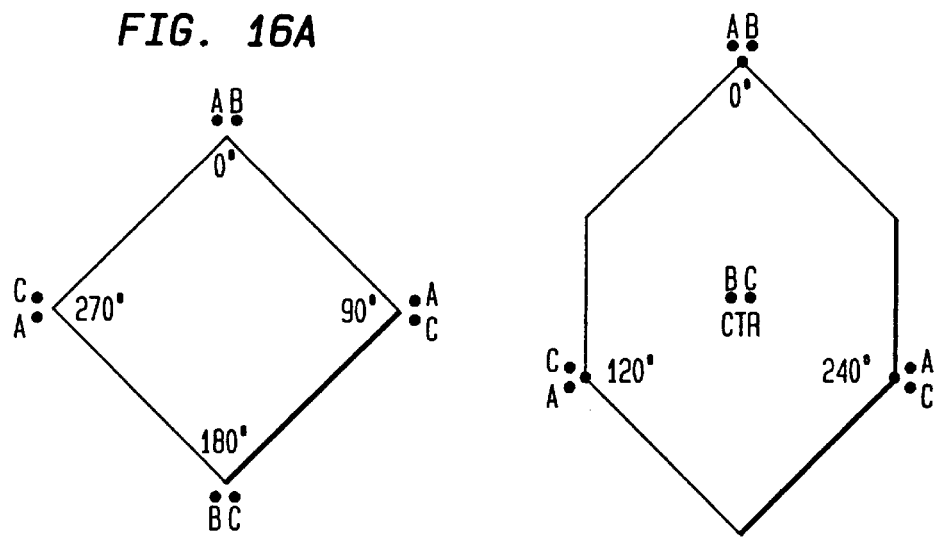

CELLULAR COMMUNICATION SYSTEM WITH VIRTUAL ANTENNAS

RELATED APPLICATION

This application is a continuation-in-part of U.S. patent application Ser. No. 08/790,840, filed Jan. 30, 1997 now U.S. Pat. No. 6,052,599.

BACKGROUND OF THE INVENTION

The present invention relates to cellular communications, and, more particularly, is directed to arrangement of antennas in a cell.

FIG. 1 shows cell 10 of a conventional cellular communication network having a transmitting antenna 20. In fact, the coverage area of antenna 20 has an approximately circular shape, but it is convenient to model the cellular network as formed of hexagonal (rather than circular) cells. Antenna 20 is modelled as being at the center of cell 10, but practically, it may not be precisely centered with respect to the location of other antennas.

As shown in FIG. 2, antenna 20 transmits message A at a carrier frequency $f_1$. When the signal to be transmitted comprises time division multiplexed signals A, B, C, the transmission from antenna 20 is as shown in FIG. 3.

FIG. 4 shows receiving apparatus 50, such as a cellular telephone. Antenna 51 receives messages transmitted from antenna 20, and possibly from other antennas in other cells, supplies a received signal to receiver circuit 52, which processes the received signal to extract the message transmitted by antenna 20. Receiver circuit 52 supplies the extracted message to processor 53, which converts the extracted message into a user perceivable signal, such as an audible speech signal, and applies the user perceivable signal to amplifier 54 which is adapted to convert the user perceivable signal into an acoustic signal.

Receiving apparatus 50 may be a pager, in which case the user perceivable signal is a visually displayable signal, and instead of amplifier 54, a display is provided. Alternatively, receiving apparatus 50 may also have transmission capability (not shown).

To increase the traffic carrying capacity of a cell, various schemes are used.

FIG. 5 shows cell 11 having antennas 21, 22, 23 located therein, and transmitting at carrier frequencies $f_1$, $f_2$, $f_3$, respectively. As shown in FIG. 6, each antenna transmits a separate message, indicated as A, B, C. Of course, the signal at each carrier frequency may use a time division multiple access (TDMA) scheme. For example, $f_i$ may represent messages D, E, F, D, E, F, . . . , $f_2$ may represent messages G, H, G, H, and $f_3$ may represent messages I, J, K, L, I, J, K, L . . . The antennas 21, 22, 23 may be a single antenna.

FIG. 7 shows cell 12 having antennas 24, 25, 26 located therein, and each transmitting in a wide bandwidth channel centered at carrier frequency $f_1$. However, as shown in FIG. 8, each of the antennas 24–26 uses a distinct modulating code, so that a receiver demodulating its received signal with the same distinct code properly recovers the transmitted message from the intended one of antennas 24–26. The scheme illustrated in FIGS. 7 and 8 is referred to as a spread spectrum scheme, in particular, a code (or carrier) division multiple access (CDMA) scheme. Here, too, the signal transmitted by each of antennas 24–26 may be a time division multiplexed signal.

Edge excited cells have been proposed in which three antennas are located at respective vertices of a hexagonal cell. In known CDMA systems, each of the antennas transmits the same signal. A transmission from a mobile station is received correctly if at least one of the antennas has correctly received the transmission. This configuration of antennas in a cell is also referred to as a corner-fed hexagonal pattern.

Since traffic continues to increase, additional techniques for increasing the traffic carrying capacity of a cell are sought.

SUMMARY OF THE INVENTION

In accordance with an aspect of this invention, there are provided a method of and a system for cellular communications, and, more particularly, is directed to arrangement of antennas in a cell. In accordance with an aspect of this invention, in a cellular communication method and system having a cell with a plurality of signal transmission sites located at a sum of k–v different positions, k≧2, at least v virtual sites wherein v≧1, a plurality of antennas located at the k–v signal transmission sites each transmits one of m signals at the same carrier frequency, m≧2, so that each of the signals is transmitted from at least one of the k different positions.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 14 is a diagram of a cell in a cellular communication network according to the present invention;

FIG. 15 is a chart depicting transmission from antennas in the cell of FIG. 14;

FIGS. 16A and 16B illustrate antenna configurations in cells;

DETAILED DESCRIPTION OF THE PREFERRED EMBODIMENTS

Generally, a cell according to the present inventive technique uses a spatial diversity scheme to increase its traffic carrying capacity. Instead of locating multiple antennas at the center of the cell, the antennas are located at k separated positions in the cell, and a receiver in the cell uses k antennas, instead of one antenna. The antennas in the cell transmit m different signals on the same frequency in the cell. The receiver relies on appropriate spatial processing of the signals received from different directions to distinguish the desired signal which is possible because the signals arrive from different directions.

Furthermore, each of k locations may haven antennas, and each of the n antennas at a location transmits one of the m signals. When each of the m signals is transmitted from at least two locations, even if the transmission from one of the locations is blocked, the receiver is still able to receive the desired signal from at least one of the other locations. Using multiple antennas to transmit one signal simulates the effect of scatterers in a single antenna environment.

The present inventive technique may be used when the m signals are unrelated, that is, are separate data streams, and also may be used when the m signal are related, that is, form portions of one data stream. An example of unrelated signals are those from different sending parties to different receiving parties. An example of related signals are portions of a multiplexed data stream.

Figure 9:
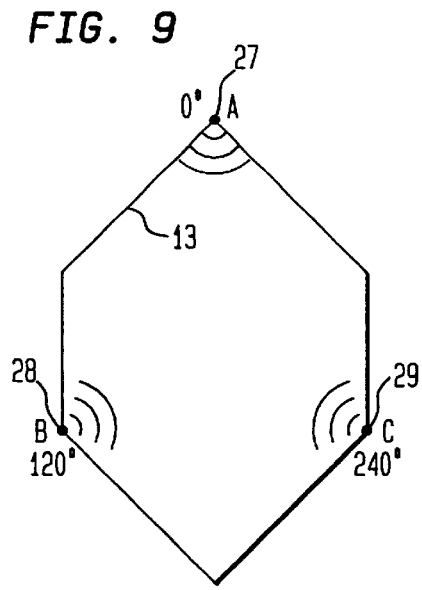
FIG. 9 is a diagram of a cell in a cellular communication network according to the present invention.

Referring now to the drawings, and in particular to FIG. 9, there is illustrated cell 13 of a cellular communication network according to the present inventive technique. Cell 13 has directional antennas 27, 28, 29 spaced generally equidistantly around its perimeter, at locations referred to as 0°, 120° and 240°, respectively. Antennas 27, 28, 29 are directional antennas with 120° beamwidth. Alternatively, instead of antennas 27, 28, 29 being directional, reflectors can be placed behind them to avoid covering the adjacent cells. In other embodiments, at least some of the antennas are located at positions other than the perimeter of the cell. There are at least two antennas per cell.

Figure 10:
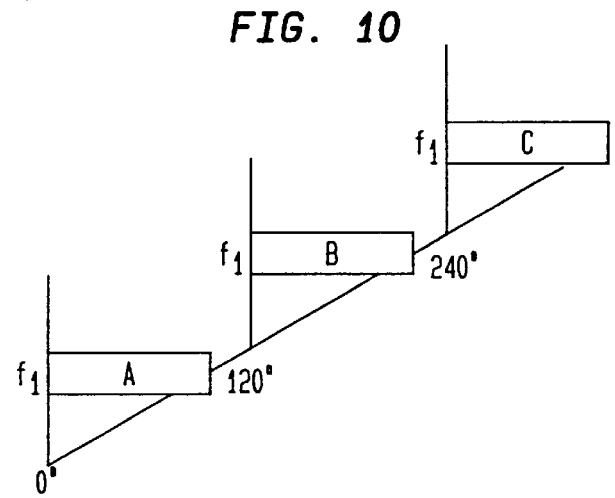
FIG. 10 is a chart depicting transmission from antennas in the cell of FIG. 9.

The signal from each of antennas 27–29 is directed towards the center of the cell to reduce the interference from the signals in neighboring cells. As shown in FIG. 10, each of the signals is at a carrier frequency $f_1$, and each represents a different signal, indicated as signals A, B, C, respectively. Each signal may be in $\pi/4$ shifted QPSK format. Other signal modulation schemes are also suitable.

Figure 11:
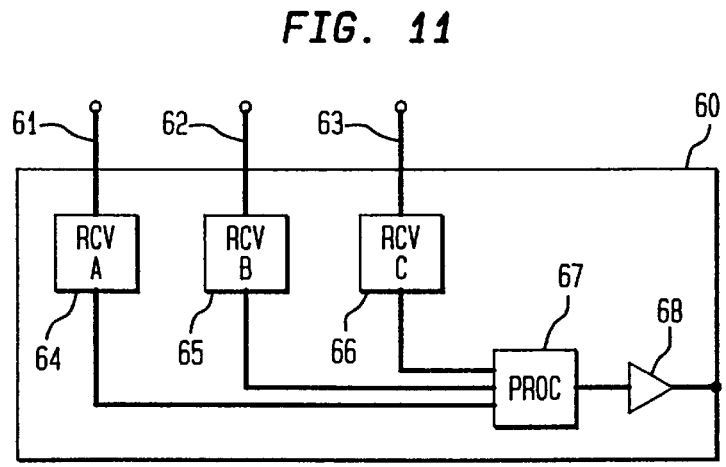
FIG. 11 is a diagram of a receiver according to the present invention used in the cell of FIG. 9.

FIG. 11 shows receiving apparatus 60, such as a cellular telephone. Antennas 61, 62, 63 are adapted to receive signals from antennas 27–29, and possibly from other antennas in other cells and to supply a received signal to receiver circuits 64, 65, 66, respectively.

Each of receiver circuits 64, 65, 66 serves to bandpass filter the signal supplied thereto in a passband centered at $f_1$, to amplify the bandpass filtered signal and possibly to downconvert the amplified signal to produce a composite of all signals having a carrier frequency of approximately $f_1$, and to supply the thus obtained composite signal to processor 67. The composite signals from each of receiver circuits 64–66 have respectively different phases due to the differing positions of antennas 61–63.

Processor 67 is adapted to convert the composite signals into a user perceivable signal such as an audible speech signal, using a technique described below, and to apply the user perceivable signal to amplifier 68 which is adapted to convert the user perceivable signal into an acoustic signal.

The signal transmitted by each of antennas 27–29 may be a TDMA signal.

Figure 12:
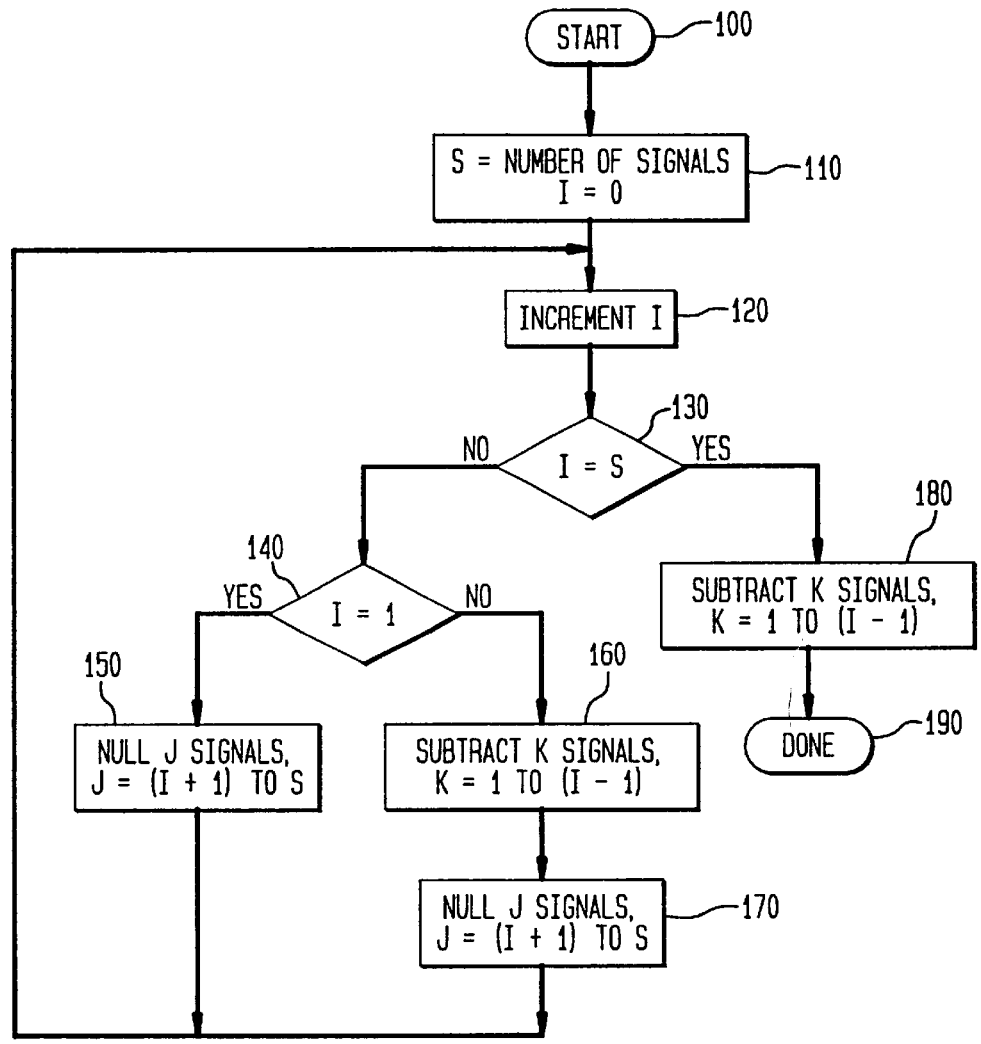
FIG. 12 illustrates a flowchart of processing performed by the receiver of FIG. 11.

FIG. 12 illustrates a flowchart of how processor 67 converts the composite signals supplied thereto into a user perceivable signal by applying nulling and cancellation processing to separate (or extract) the transmitted signals. It will be recalled that each of antennas 61–63 receives a signal comprising the signals transmitted from antennas 27–29. Some of the transmitted signals may, of course, be blocked by environmental conditions, such as physical bodies or other interference.

Figure 13:
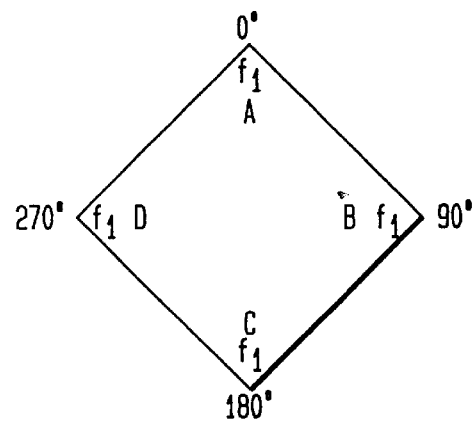
FIG. 13 is a diagram of a cell for use with the flowchart of FIG. 12.

At step 110, processor 67 initializes parameter S to be the number of signals, and parameter I to a value of zero. For this example, let it be assumed there is a set of four signals A, B, C, D transmitted at a carrier frequency $f_1$, from each of four locations (such as 0°, 90°, 180°, 270°) in a cell, as shown in FIG. 13, so S=4.

Extraction of signal A will now be described.

At step 120, processor 67 increments parameter I (I=1). At step 130, processor 67 tests whether I=S. Since I is less than S, processor 67 proceeds to step 140 and tests whether I=1. Since I=1 in this iteration, processor 67 proceeds to step 150.

At step 150, processor 67 nulls J signals (J=2 to 4), that is, signals B, C, D, from the composite signal.

Signal nulling is performed by beamforming the composite signals while considering signals B, C, D to be interference signals. Beamforming is described in "Beamforming: a versatile approach to spatial filtering", van Veen, B. D. et al., *IEEE ASSP Magazine*, April 1988, pages 4–24, the disclosure of which is hereby incorporated by reference. Beams in the antenna pattern are artificially formed in the direction of each signal, while minimizing the influence of others. Numerical weights by which to multiply the received composite signals are selected to minimize the mean square error (MSE) between the desired signal and the weighted received composite signals. Beamforming in a cellular communication system is discussed in "An Adaptive Array for Mobile Communication Systems", Anderson, S. et al., *IEEE Trans. Vehicular Tech.*, vol. 40, no. 1, February 1991, pages 230–236, the disclosure of which is hereby incorporated by reference. More general adaptive array processing may be used instead of beamforming, using techniques known to those of ordinary skill.

Processor 67 then returns to step 120. At this point, signals B, C, D have been nulled from the composite signal, so what remains is signal A.

Extraction of signal B will now be described.

At step 120, processor 67 increments parameter I (I=2). At step 130, processor 67 tests whether I=S. Since I is less than S, processor 67 proceeds to step 140 and tests whether I=1. Since I=2 in this iteration, processor 67 proceeds to step 160.

At step 160, processor 67 subtracts the previously extracted signal(s) from the composite signal (A+B+C+D). At this point, signal A has been extracted, so the result of the subtraction is an intermediate signal (B+C+D). Processor 67 then proceeds to step 170 and nulls J signals (J=3 to 4), that is, signals C, D, from the intermediate signal, as generally described above. What remains after nulling is signal B.

Processor 67 returns to step 120.

Extraction of signal C will now be described.

At step 120, processor 67 increments parameter I (I=3). At step 130, processor 67 tests whether I=S. Since I is less than S, processor 67, proceeds to step 140 and tests whether I=1. Since I=3 in this iteration, processor 67 proceeds to step 160.

At step 160, processor 67 subtracts the previously extracted signal(s) from the composite signal (A+B+C+D). At this point, signals A and B have been extracted, so the result of the subtraction is an intermediate signal (C+D). Processor 67 then proceeds to step 170 and nulls J signals (J=4 to 4), that is, signal D, from the intermediate signal, as generally described above. What remains after nulling is signal C.

Processor 67 returns to step 120.

Extraction of signal D will now be described.

At step 120, processor 67 increments parameter I (I=4). At step 130, processor 67 tests whether I=S. Since I is equal to S, processor 67 proceeds to step 180, and subtracts the previously extracted signals A, B, C from the composite signal (A+B+C+D) to extract signal D. Processor 67 then proceeds to step 190, and determines that all the transmitted signals have been extracted, so processing is completed.

In other embodiments, each of k locations has n antennas. A set of m signals is transmitted such that each of the m signals is transmitted from at least two of the k·n antennas.

For redundancy, a situation in which k=m=n is preferred.

FIG. 14 shows cell 14 having antennas around its perimeter at locations referred to as 0°, 120° and 240°. At each of these three locations, there are three antennas. Each of the three antennas at a location transmits one of three signals at a carrier frequency $f_1$. In this configuration, even if the transmission from one of the locations is blocked, the receiver is still able to receive the desired signal from the other two locations.

Specifically, location 0° of cell 14 has antennas 30, 31, 32, respectively transmitting signals A, B, C. Location 120° of cell 14 has antennas 33, 34, 35, respectively transmitting signals A, B, C. Location 240° of cell 14 has antennas 36, 37, 38, respectively transmitting signals A, B, C.

FIG. 15 shows this situation, namely, that at each of the three locations, the same set of three signals is transmitted, and each of the transmissions is at a carrier frequency $f_1$.

FIG. 16A shows a partial redundancy situation in which there are four locations 0°, 90°, 180°, 270° (k=4) each having two antennas (n=2) transmitting three signals A, B, C (m=3). It will be seen that signals A and C are transmitted from each of three antennas, while signal B is transmitted from only two antennas.

FIG. 16B is similar to FIG. 16A, except that the four locations are at 0°, 120°, 240° and center (the first three locations are equidistantly spaced around the perimeter of the cell, while the fourth location is at the center of the cell).

Figure 17:
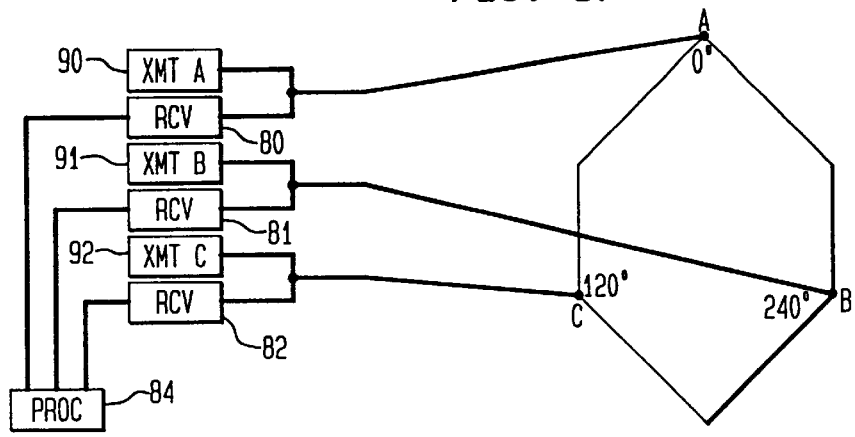
FIGS. 17–19 illustrate different signal distribution techniques.
Figure 18:
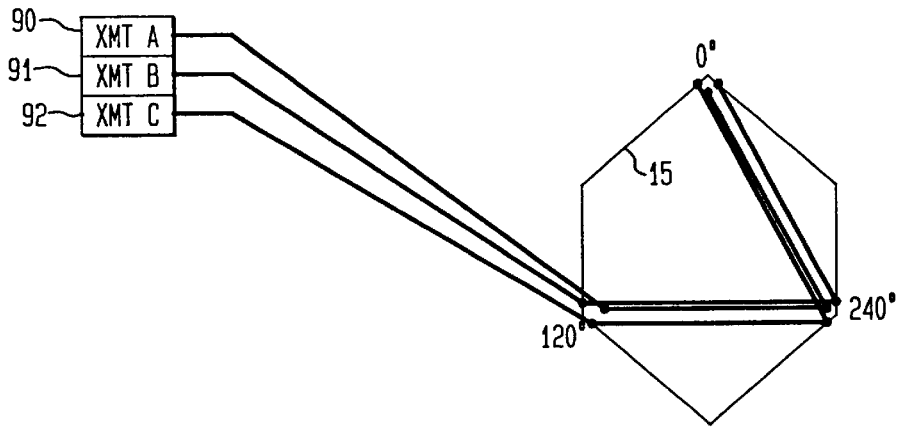
Figure 19:
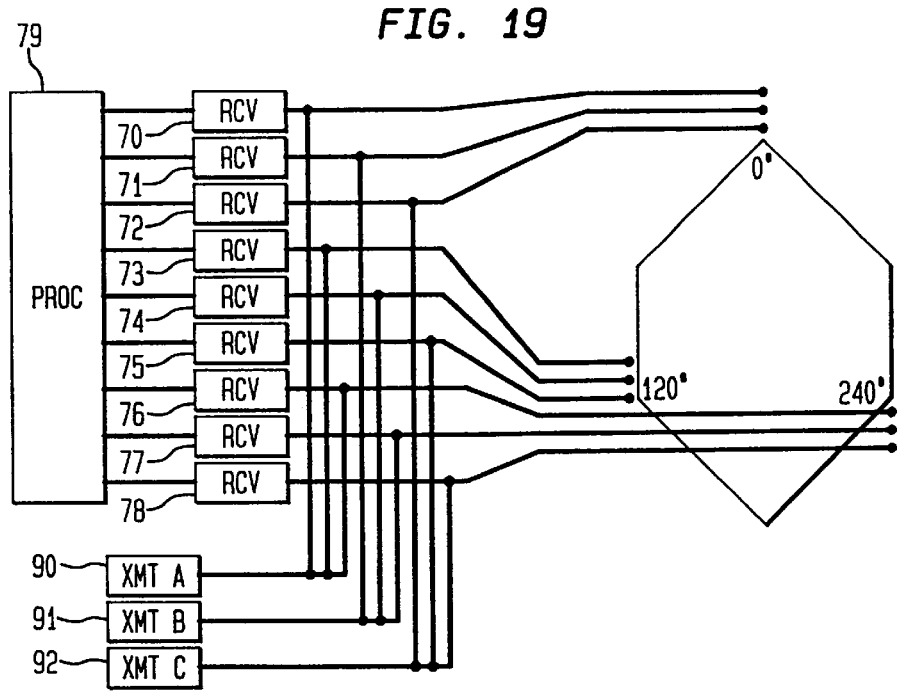

FIGS. 17–19 illustrate different signal distribution techniques for the set of signals transmitted from each antenna location.

FIG. 17 shows transmitters 90, 91, 92 respectively applying signals A, B, C to cables which are coupled to base station antenna locations 0°, 120°, 240° of cell 9. Wireless microwave links may be used instead of cable. Receivers 80, 81, 82 are co-located with transmitters 90–92. Each of receivers 80–82 receives a composite of all the signals transmitted by all of the mobile units in cell 9, and functions in similar manner as receiver circuits 64–66 to deliver respective composite signals differing in phase to processor 84, which operates in similar manner as processor 67 to extract a signal for each of the transmitting mobile units in cell 9. Transmitters 90–92, receivers 80–82 and processor 84 are located at a mobile switching center (MSC) (not shown) which serves cell 9.

FIG. 18 shows transmitters 90, 91, 92 respectively applying signals A, B, C to cables which are coupled to base station antenna locations 0°, 120°, 240° of cell 15 in daisy chain fashion. Transmitters 90–92 are located at a mobile switching center (MSC) (not shown) which serves cell 15.

FIG. 19 shows receivers 70–78 respectively receiving signals from each of the antennas in cell 15. Each of receivers 70–78 receives a composite of all the signals transmitted by all of the mobile units in cell 15, and functions in similar manner as receiver circuits 64–66 to deliver respective composite signals differing in phase to processor 79, which operates in similar manner as processor 67 to extract a signal for each of the transmitting mobile units in cell 15.

Instead of arranging the transmission as shown in FIG. 18, transmitters 90–92 may be configured as shown in FIG. 19. Transmitters 90–92, receivers 70–78 and processor 79 are located at a mobile switching center (MSC) (not shown) which serves cell 15.

Addition of antennas to increase capacity can be done in several ways, and may include addition of microcells to an existing cell plan.

Figure 1:
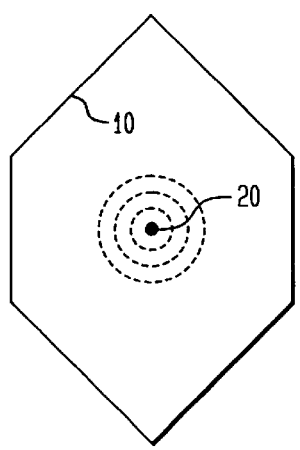
FIG. 1 is a diagram of a cell in a conventional cellular communication network.
Figure 2:
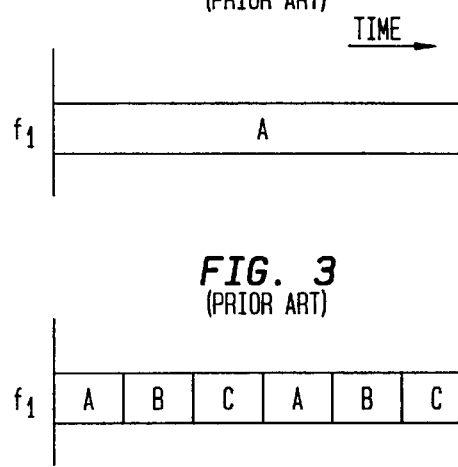
FIGS. 2 and 3 are charts depicting transmission from an antenna in the cell of FIG. 1.
Figure 3:
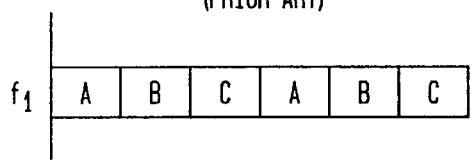
Figure 4:
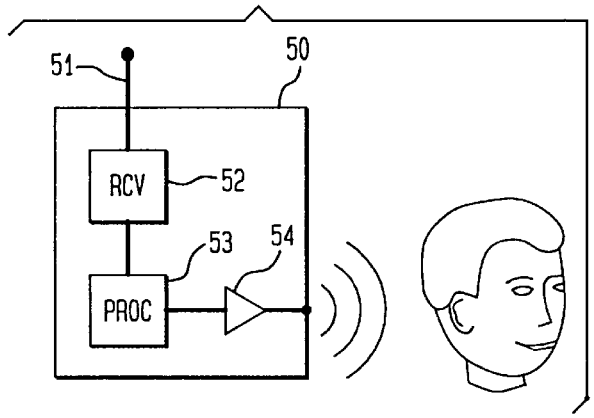
FIG. 4 is a diagram of a conventional receiver used in the cell of FIG. 1.
Figure 5:
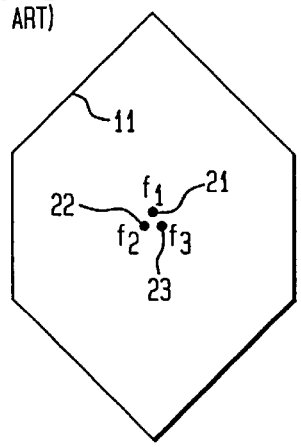
FIG. 5 is a diagram of another cell in a conventional cellular communication network.
Figure 6:
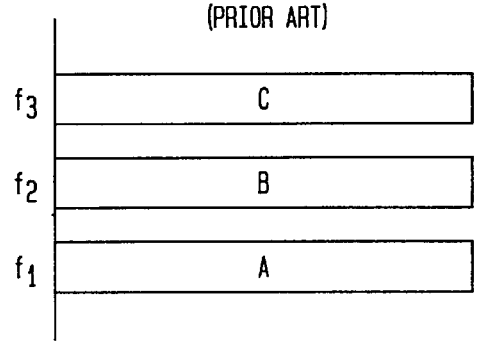
FIG. 6 is a chart depicting transmission from antennas in the cell of FIG. 5.
Figure 7:
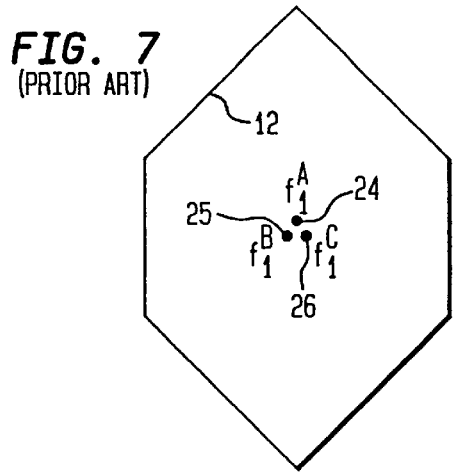
FIG. 7 is a diagram of another cell in a conventional cellular communication network.
Figure 8:
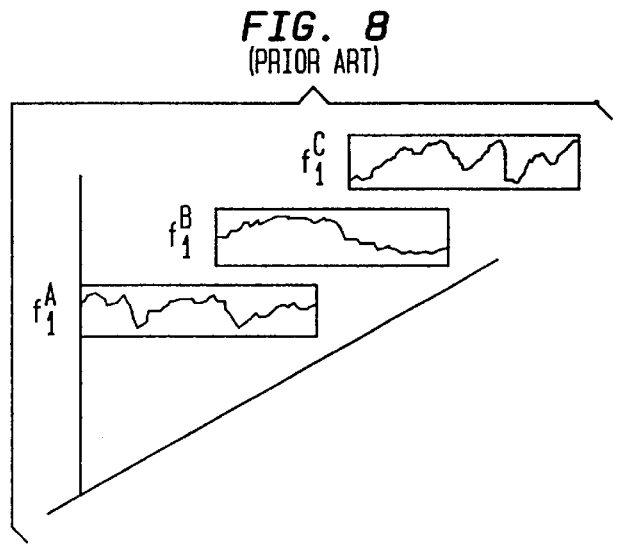
FIG. 8 is a chart depicting transmission from antennas in the cell of FIG. 7.
Figure 20:
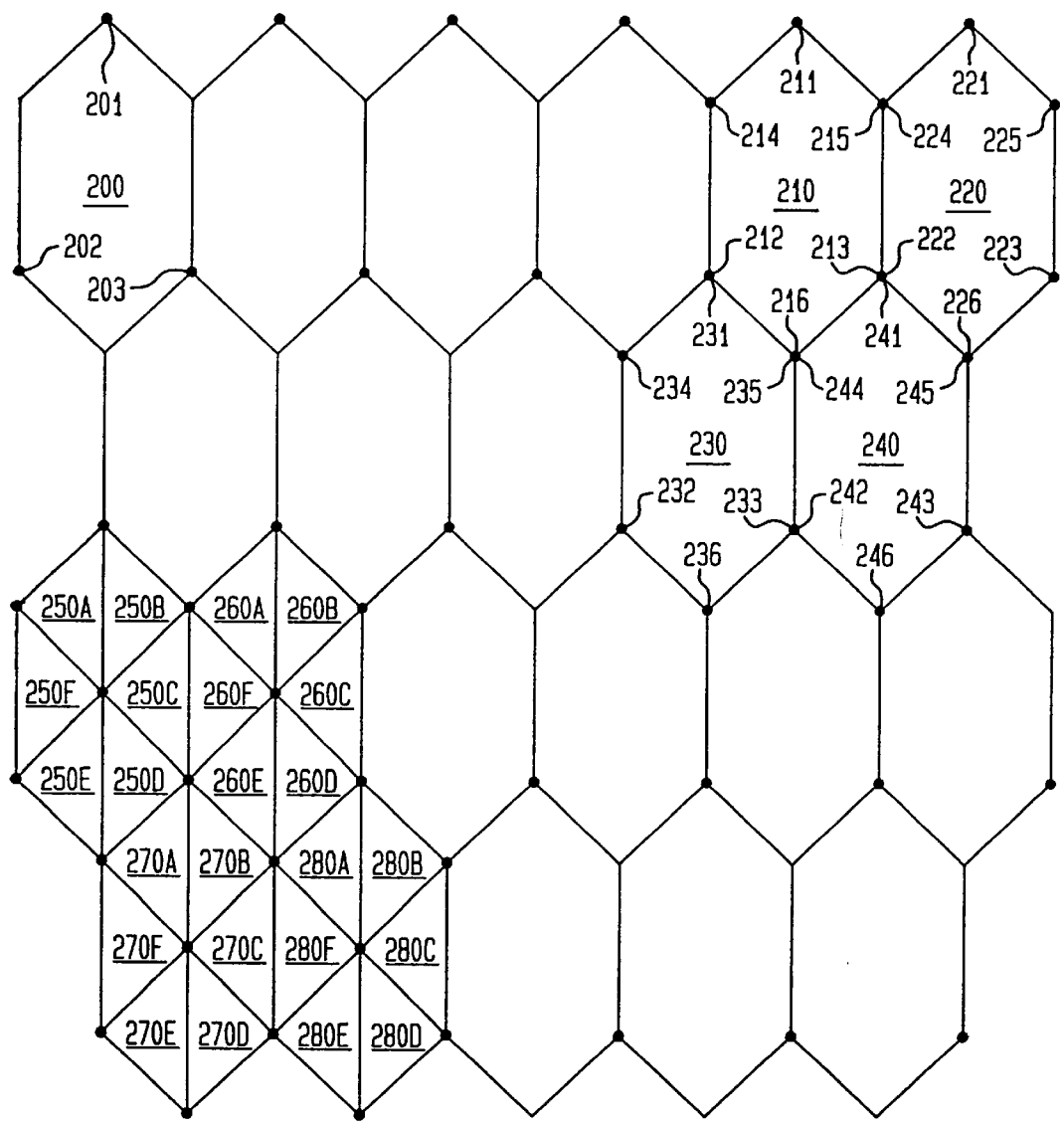
FIGS. 20–21 are diagrams illustrating addition of antennas to an existing hexagonal cell plan.

FIG. 20 shows a layout of hexagonal cells. Cell 200 is shown as having antennas located at 0°, 120° and 240°, referenced as positions 201, 202, 203, respectively, as for cells 13 and 14 discussed above. The other cells in FIG. 20 similarly have antennas located at 0°, 120° and 240°. Let it be assumed that each location has a set of three antennas, unless otherwise specified. Cell 10 in FIG. 1 has one antenna at one position, whereas cell 200 in FIG. 20 has nine antennas at three positions. Relative to the capacity of cell 10 in FIG. 1, cell 200 in FIG. 20 has three times the capacity, since three separate signals are transmitted on the same carrier frequency from each of the antennas in the set of antennas located at each of positions 201–203.

Adding antennas at the unused vertices of each hexagonal cell is illustrated in cells 210, 220, 230, 240 of FIG. 20. Before the addition, a set of three antennas for each cell was at positions 211, 212, 213, 221, 222, 223, 231, 232, 233, 241, 242, 243. As a consequence of the addition, a set of three additional antenna per cell is added at positions 211–243, and a set of six antennas for each cell is added at positions 214, 215, 216, 224, 225, 226, 234, 235, 236, 244, 245, 246. Thus, each of cells 210–240 has six antennas at each of six positions. Cell 210 has 36 antennas located at six positions. Relative to the capacity of cell 10, cell 210 has six times the capacity, since six separate signals are transmitted on the same carrier frequency from each of the antennas in the set of antennas located at each of positions 211–216.

Adding antennas at the center and at the unused vertices of each hexagonal cell, and then splitting the original hexagonal cell into six triangular microcells having 60° sectors rather than 120° sectors is illustrated in microcells 250A–250F, 260A–260F, 270A–270F, 280A–280F of FIG. 20. Each of microcells 250A–280F has three antennas at each of three positions. Each of microcells 250A–250F has nine antennas, and there are six microcells in the group, thus, the area formerly occupied by cell 250 has 54 antennas at seven positions (the six vertex positions have two sets of three antennas, while the center position has six sets of three antennas). In fact, the vertex positions also have a total of six sets of three antennas, but each microcell sharing the vertex is served by only two sets of the six sets. Relative to the capacity of cell 10, the group of microcells 250A–250F has eighteen times the capacity, since in each microcell, three separate signals are transmitted on the same carrier frequency from each of the antennas in the set of three antennas located at vertex of a triangular microcell, and there are six microcells in the group, thus eighteen signals are transmitted in the area formerly occupied by cell 250.

Figure 21:
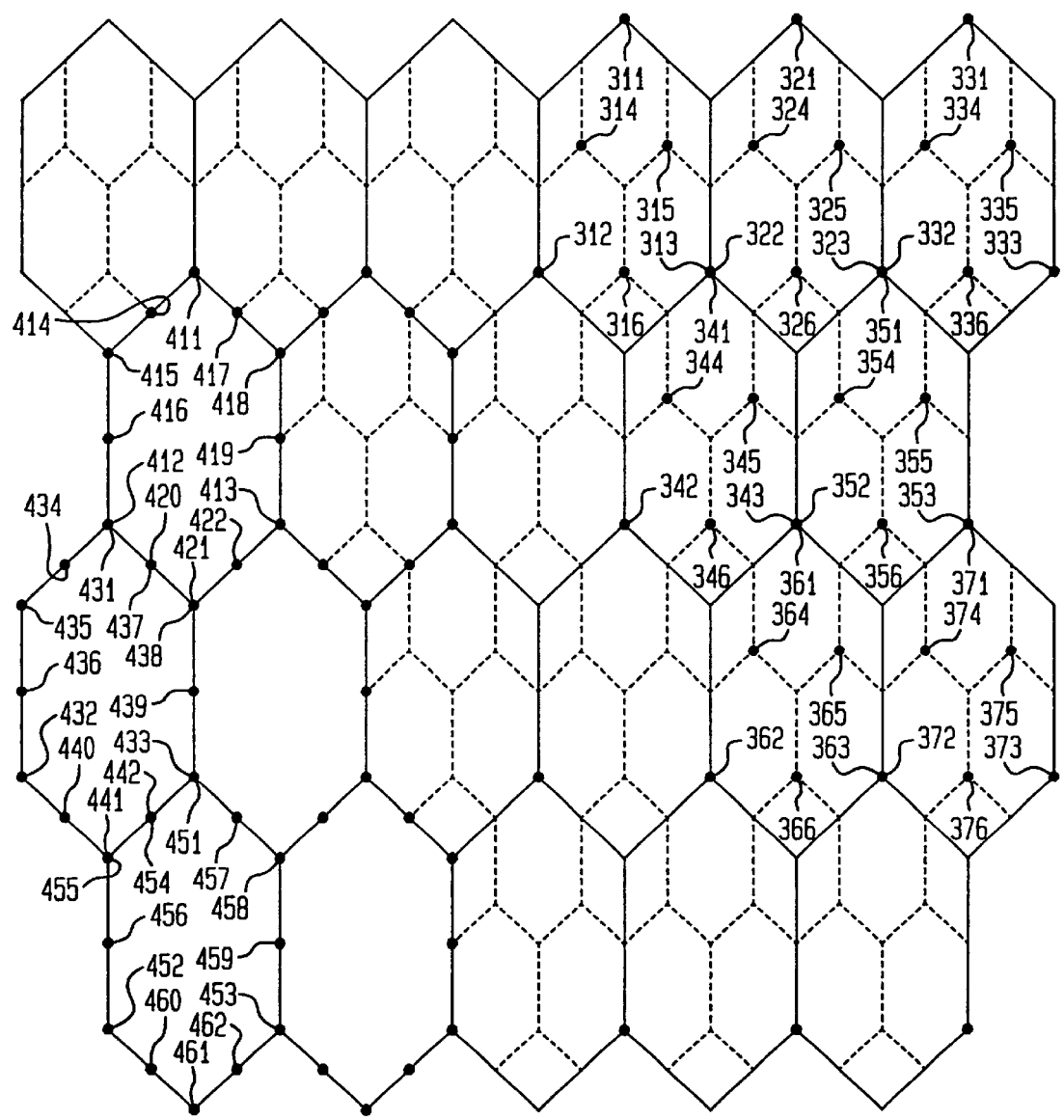

FIG. 21 shows a plan of hexagonal cells (solid lines). Cell splitting which results in four hexagonal microcells (dashed lines) occupying the area of one cell is also depicted in FIG. 19. Other ways of configuring microcells will be apparent to one of ordinary skill in the art.

The microcells in the upper right region of FIG. 21 each have antennas at positions 0°, 120°, 240°. More specifically, the cells have antennas at positions 311, 312, 313, 321, 322, 323, 331, 332, 333, 341, 342, 343, 351, 352, 353, 361, 362, 363, 361, 362, 363, while the microcells have antennas at the aforementioned positions and at positions 314, 315, 316, 324, 325, 326, 334, 335, 336, 344, 345, 346, 354, 355, 356, 364, 365, 366, 374, 375, 376. The number of antennas at each position in a microcell is the same as the number of antennas at each position in a cell. Whereas a cell uses nine antennas, the four microcells occupying the region of a cell use 36 antennas. The capacity of a region occupied by microcells as described is four times the capacity of a region occupied by a cell.

An alternative antenna arrangement is shown in the lower left region of FIG. 19. Here, a cell is not split into microcells. Instead, antennas are added at positions on the perimeter of the cell equidistantly spaced from the previous neighboring positions. For example, positions 411, 412, 413 are at 0°, 120°, 240° of a hexagonal cell. Next, antennas are added to the remaining vertices of the hexagonal cell, at positions 415, 418, 421. Finally, antennas are added at the midpoints of the segments forming the hexagon, at positions 414, 417, 419, 422, 420, 416. There are a total of twelve positions on the perimeter of the cell. The number of antennas at each position in the cell is increased to twelve, matching the number of positions. A cell in this configuration uses 144 antennas. The capacity of cell with twelve positions, as described, is four times the capacity of a cell with three positions and three antennas at each position.

The arrangement in the upper right region of FIG. 21 is preferred over the arrangement in the lower left region of FIG. 21 because it uses fewer antennas (36 instead of 144), and because mobile receivers in the upper right region require only three antennas, rather than twelve. Minimizing the number of antennas per mobile unit is an important consideration.

Figure 22:
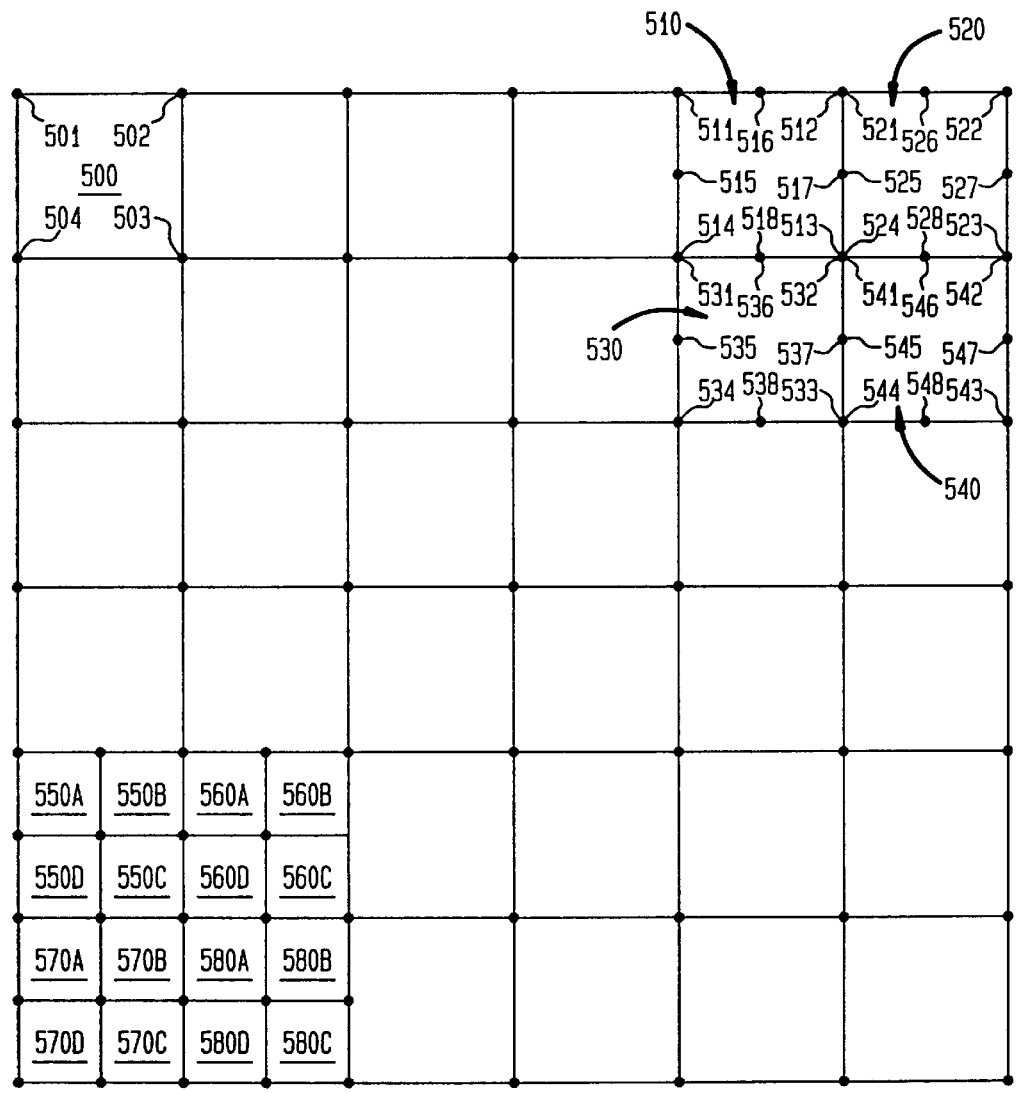
FIG. 22 is a diagram illustrating addition of antennas to a rectilinear cell plan.
Figure 23:
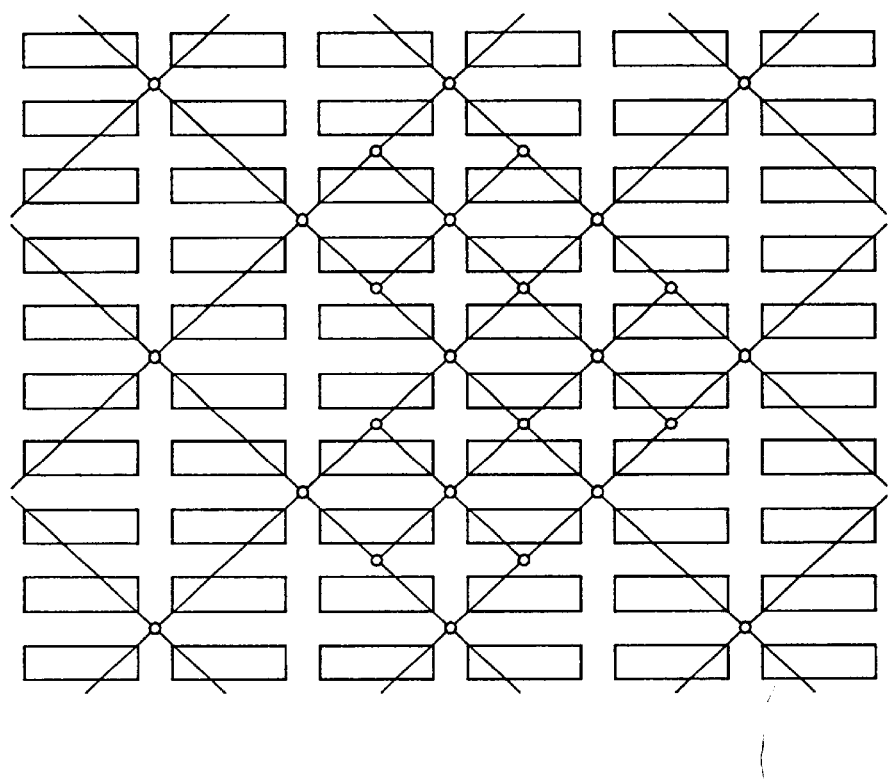
FIGS. 23–24 are diagrams illustrating different city cell layouts.
Figure 24:
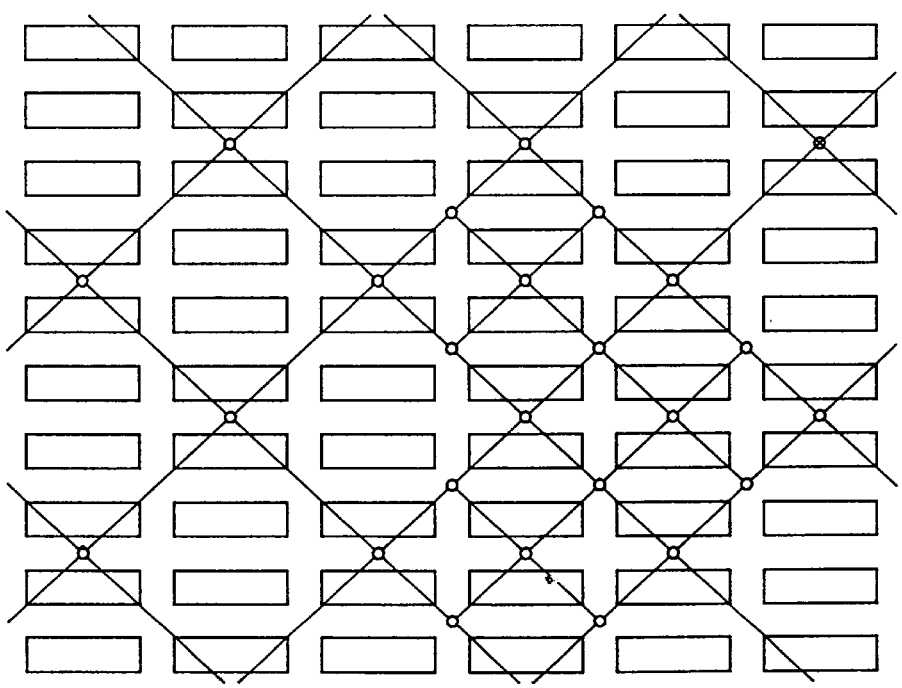

FIGS. 22–24 illustrate rectilinear cells. Although the cells of FIG. 22 are depicted as square, it will be appreciated that they could be rectangular, when, for example, antennas are positioned at street corners in a city laid out in rectangular form, such as mid-town Manhattan, N.Y., which has relatively long blocks in the east-west direction and relatively short blocks in the north-south direction, as shown in FIGS. 23–24.

Cell 500 of FIG. 22 is shown as having antennas located at positions 501, 502, 503, 504. Antennas 501–504 are directional antennas having a 90° beamwidth. Let it be assumed that there are four antennas at each position. Cell 500 includes 16 antennas. The capacity of cell 500 is four times the capacity of a cell of the same size having one antenna at its center.

Cells 510, 520, 530, 540 illustrate addition of antennas at positions around the perimeter of the cell, equidistantly spaced between the previous neighboring antennas. That is, capacity is added by placing antennas at locations 515–518, 525–528, 535–538 and 545–548. There are eight positions in each cell, so eight antennas should be located at each position. Cell 510, for example, includes 64 antennas. The capacity of cell 510 is twice the capacity of cell 500.

Alternatively, in addition to adding antennas to positions on the perimeter of a cell, antennas can also be added at the center of the cell, and the cell split into microcells. The groups of microcells 550A–550D, 560A–560D, 570A–570D, 580A–580D, each occupy the area of one cell. Microcells 550A–550D each have 16 antennas, so this group of microcells has 64 antennas. The capacity of microcells 550A–550D is four times the capacity of cell 500. The arrangement in the lower left region of FIG. 22 is preferred over the arrangement in the upper right region of FIG. 22 because it uses fewer antennas.

FIG. 23 illustrates a city cell layout having cell sites at street corners. FIG. 24 illustrates a city cell layout having cell sites at the center of long blocks. Due to the presence of buildings on the blocks, communication performance differs in the cell layouts of FIGS. 23 and 24.

FIGS. 23 and 24 each show three original cells split into microcells. The microcells in FIGS. 23 and 24 are identical in that each microcell has two vertices at street corners and two vertices at centers of blocks.

In the above-described embodiments, actual antenna are placed in a cell or at the cell boundary. In another embodiment, environmental scatterers are employed at v different locations as virtual antennas, that is, the signal from an original antenna is reflected by environmental scatterers to create reflected signals. The environmental scatterers perform the same function as a plurality of antennas in a cell, and so are referred to as virtual antennas. Employing virtual antennas reduces the number of required transmission sites and results in a cost savings in devising such a system. The following embodiments are described wherein the environmental scatterers are one or more buildings or building walls. It should be noted, however, that many types of objects located in the environment may be used as environmental scatterers.

Figure 25:
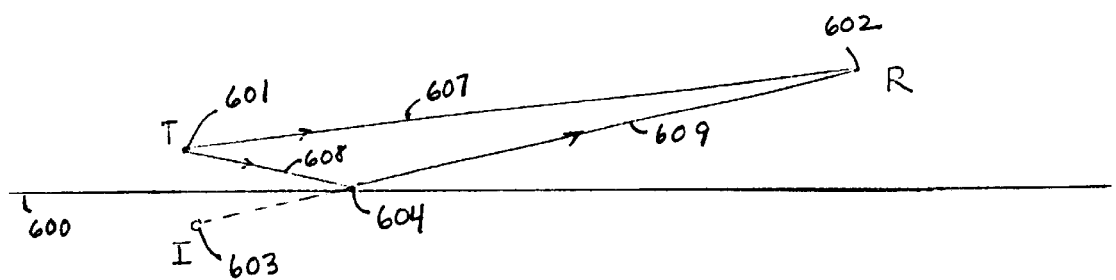
FIGS. 25–28C are diagrams illustrating virtual antennas.

FIG. 25 show actual transmitter 601, receiver 602 and building wall 600. Path 607 between actual transmitter 601 and receiver 602 is a line-of-sight signal. Path 608 between actual transmitter 601 and building wall point 604 and path 609 between building wall point 604 and receiver 602 form a scattering path. The signal following the scattering path is referred to as a scattering signal. The projection of path 609 through building wall point 609 can be considered as line-of-sight path from virtual antenna 603. It will be appreciated that building wall point 609 creates virtual antenna 603.

Figure 26:
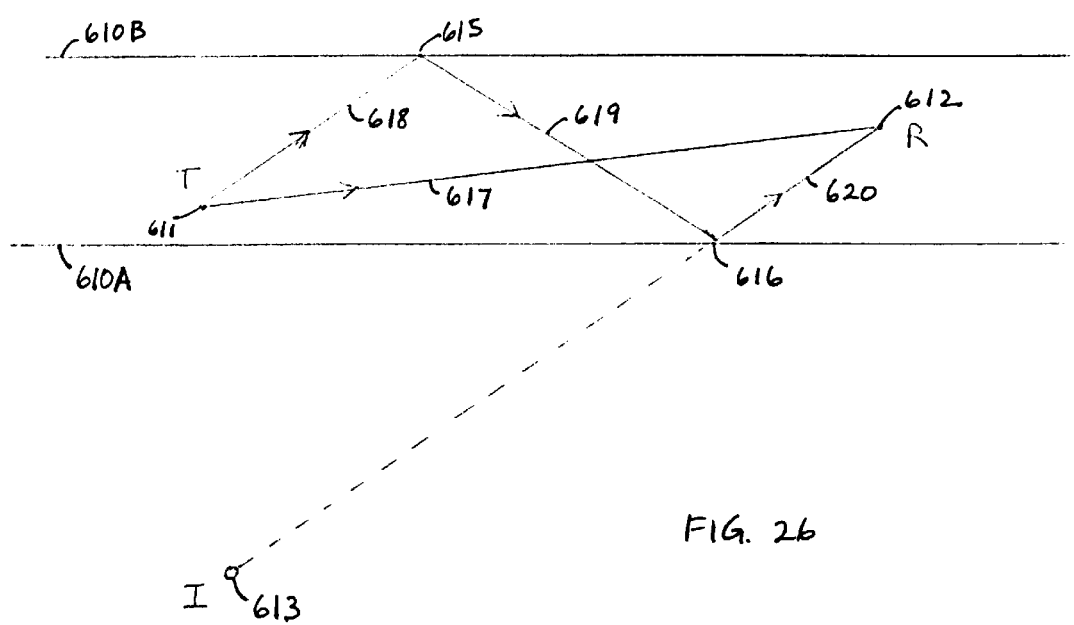

FIG. 26 shows actual transmitter 611, receiver 612 and building walls 601A, 610B. The configuration of FIG. 26 corresponds to a fixed transmitter in a sheet "canyon" formed by buildings, with a mobile receiver associated with a user walking or during along the sheet canyon. Path 617 between actual transmitter 611 and receiver 612 is a line-of-sight path. Path 618 between actual transmitter 611 and building wall point 615, path 619 between building wall points 615 and 616, and path 620 between building wall point 616 and receiver 612 form a scattering path. The projection of path 620 through building wall point 616 can be considered as a line-of-sight path from virtual antenna 613.

Figure 27:
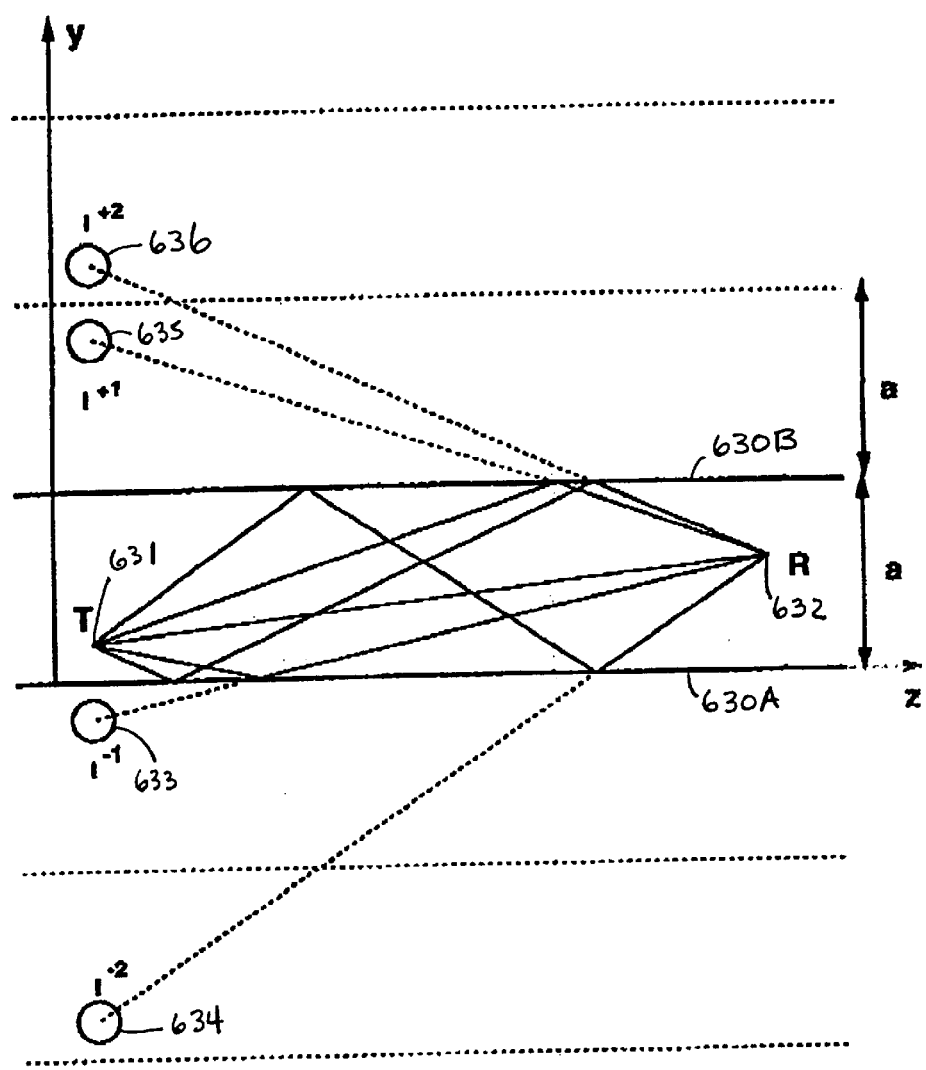

FIG. 27 shows actual transmitter 631, receiver 632 and building walls 630A, 630B. Due to multiple scattering paths, virtual antenna 633, 634, 635 and 636 are created. From the viewpoint of receiver 632, multiple signals are arriving from different direction, in a situation equivalent to multiple antennas in a cell. Accordingly, additional actual antennas in a cell are seen to be needed only when environmental scatters such as building walls are absent.

Figure 28A:
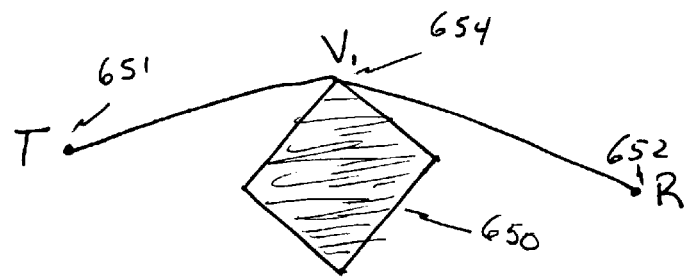
Figure 28B:
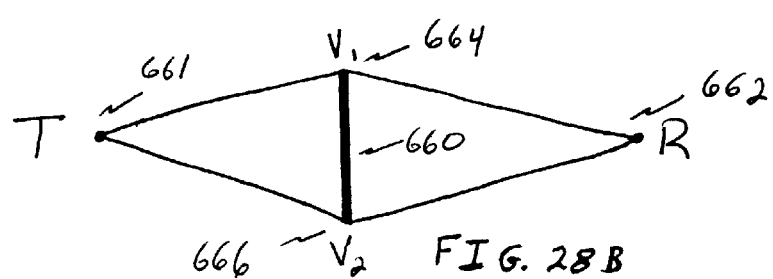
Figure 28C:
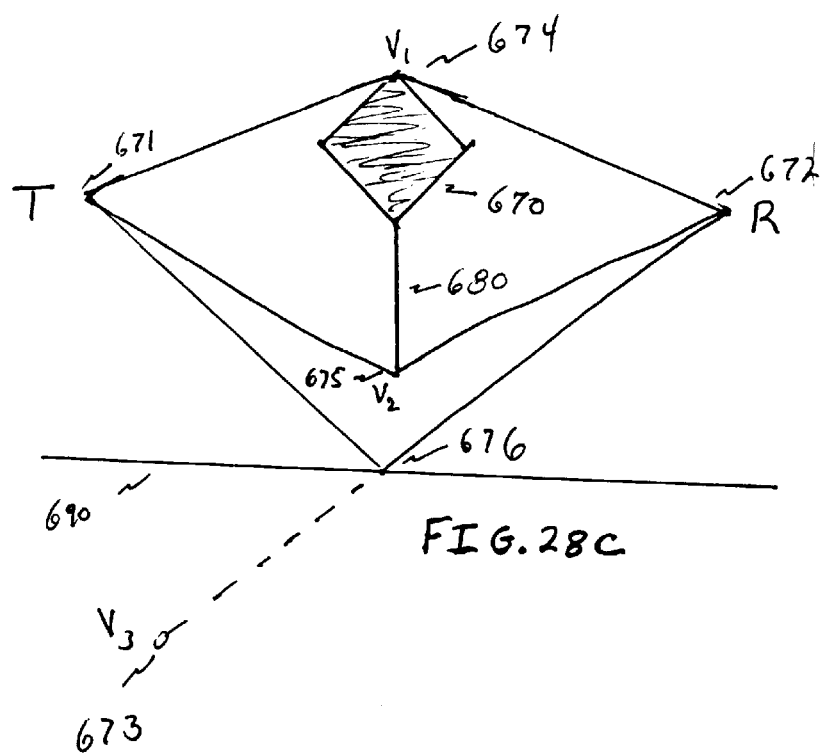

FIGS. 28A–28C illustrate additional configurations illustrating the use of virtual antennas. FIG. 28A is an example of wedge diffraction. FIG. 28A shows actual transmitter 651, receiver 652 and building edge 654 of building 650. The path between actual transmitter 651 and building edge 654 and the path between building edge 654 and receiver 652 form a scattering path. Thus, building edge 654 creates a virtual antenna at 654.

FIG. 28B is an example of edge diffraction. FIG. 28B shows actual transmitter 661, receiver 662 and building edges 664 and 666 of building 660. The path between actual transmitter 661 and building edge 664 and the path between building edge 664 and receiver 662 form a scattering path. Furthermore, the path between actual transmitter 661 and building edge 666 and the path between building edge 666 and receiver 662 form a scattering path. Thus, building edges 664 and 666 create virtual antennas at 664 and 666.

FIG. 28C is an example of a combination of edge diffraction, wedge diffraction and reflection resulting in virtual antennas. FIG. 28C shows actual transmitter 671, receiver 672 and building edge 674 of building 670 and building edge 675 of building 680. The path between actual transmitter 671 and building edge 674 and the path between building edge 674 and receiver 672 form a scattering path. Furthermore, the path between actual transmitter 671 and building edge 675 and the path between building edge 675 and receiver 672 form a scattering path. Thus, building edges 674 and 675 create virtual antennas at 674 and 675. The projection of a path through building 676 can be considered as a line-of-sight path from virtual antenna 673.

From the foregoing discussion, it will be appreciated that simple passive scatterers may be added in place of electronic antennas to create virtual antennas.

What is claimed is:

1. A cellular communication system, comprising:
 a plurality of signal transmission sites located at k–v different positions in a cell with k≧2;
 at least v virtual sites wherein v≧1;
 a plurality of antennas located at the k–v signal transmission sites, each antenna for transmitting one of m signals at the same carrier frequency in the cell with m≧1, each of the signals being transmitted from at least one of the k–v different positions, each of the signals representing a data signal devoid of a spreading signal; and
 a receiving unit located in the cell at a location other than at the plurality of signal transmission sites and having:
   at least two antennas for receiving the m signals transmitted at the same carrier frequency; and
   a converter for converting the received signals into an output signal.

2. The system of claim 1, wherein at least one of the k–v signal transmission sites are located around the perimeter of the cell.

3. The system of claim 1, wherein at least one of the k–v different positions have at least two of the antennas located thereat.

4. The system of claim 3, wherein there are n antennas located at each of the k–v different positions of the signal transmission sites with n=k.

5. The system of claim 4, wherein m=k and each of the n antennas at each of the k–v different positions of signal transmission sites are operative to transmit a respective one of the m signals.

6. The system of claim 1, wherein at least one of the antennas receives the signal to be transmitted via a communication channel originating at one of the signal transmission sites for another of the antennas, and further comprising signal sources for providing each of the signals to one of the antennas transmitting the signals.

7. The system of claim 1, wherein at least one of the cells has microcells, each of the microcells having a plurality of microcell antennas and virtual antennas located at different positions of the microcell, each of the microcell antennas for transmitting one of at least two signals at the same carrier frequency, each of the at least two signals being transmitted from at least one of the different positions in the microcell.

8. The system of claim 1, wherein there are n antennas located at each of the k–v different positions with n≧2.

9. The system of claim 1, further comprising
 a mobile unit having at least two antennas for receiving the m signals transmitted at the same carrier frequency and a converter for converting the received signals into an output signal.

10. The system of claim 9, wherein there are n antennas located at each of the k–v different positions with n≧2.

11. The system of claim 1, wherein the data signal represents a voice communication or a digital data communication.

12. A method for communicating m respectively different signals having the same carrier frequency in a cell of a cellular communication system, comprising the steps of:
 providing the m respectively different signals having the same carrier frequency to a plurality of antennas located at k–v different positions in the cell, wherein v is a number of virtual sites, each of the signals representing a respective data signal devoid of a spreading signal;
 transmitting the signals respectively provided to the antennas; and
 receiving the transmitted signals at a receiving unit located in the cell at a location other than at the k different positions and having:
   at least two antennas for receiving the transmitted signals, and
   a converter for converting the transmitted signals into an output signal.

13. The method of claim 12, wherein at least one of the antennas are located around the perimeter of the cell.

14. The method of claim 12, wherein at least one of the k–v different positions have at least two of the antennas located thereat.

15. The method of claim 14, wherein there are n antennas located at each of the k–v different positions of the signal transmission sites with n=k.

16. The method of claim 15, wherein m=k and each of the n antennas at each of the k–v different positions of signal transmission sites are operative to transmit a respective one of the m signals.

17. The method of claim 12, further comprising signal sources for providing each of the signals to the antennas transmitting the signals in a serial sequence.

18. The method of claim 12, wherein at least one of the cells has microcells, each of the microcells having a plurality of microcell antennas and virtual antennas located at different positions of the microcell, each of the microcell antennas for transmitting one of at least two signals at the same carrier frequency, each of the at least two signals being transmitted from at least one of the different positions in the microcell.

19. The method of claim 12, wherein there are n antennas located at each of the k−v different positions with n≧2.

20. The system of claim 1, further comprising a plurality of receiving antennas located at the signal transmission sites for receiving mobile signals transmitted from respective mobile antennas of a mobile unit at the same mobile carrier frequency, the plurality of receiving antennas operating simultaneously with the plurality of transmitting antennas located at the signal transmission sites.

21. The system of claim 20, wherein there are nr receiving antennas and nt transmitting antennas located at each of the k−v different positions with nr≧2 and nt≧2.

22. A method for cellular communication, comprising the steps of:

transmitting m respectively different signals having the same carrier frequency in a cell of a cellular communication system from a plurality of transmitting antennas located at k−v different positions in the cell, wherein v is a number of virtual sites, each of the signals representing a data signal devoid of a spreading signal, at least one of the k−v positions having at least two transmitting antennas, receiving the m signals transmitted at the same carder frequency at a mobile unit having at least two antennas, and converting the received signals into an output signal.

23. The method of claim 22, wherein there are n transmitting antennas located at each of the k−v different positions with n≧2.

24. A method for cellular communication, comprising the steps of transmitting m respectively different signals having the same carrier frequency in a cell of a cellular communication system from at least two transmitting antennas located at a mobile unit in the cell, each of the signals representing a data signal devoid of a spreading signal, receiving, at a plurality of receiving antennas located at the k−v different positions in the cell, wherein v is a number of virtual sites, the transmitted signals, and combining the transmitted signals to produce an output signal.

25. The system of claim 24, wherein there are nr receiving antennas and nt transmitting antennas located at each of the k−v different positions with nr≧2 and nt≧2.

26. A cellular communication system, comprising:

sources of k different sub-signals representing portions of a single data stream and being devoid of a spreading signal;

at least v virtual sites;

a plurality of signal transmission sites located at k−v different positions in a cell with k≧2, and at least one antenna located at each of the signal transmission sites, each antenna for transmitting one of the k different sub-signals.

27. A method for transmitting k respectively different sub-signals having the same carrier frequency in a cell of a cellular communication system, comprising the steps of:

providing the k different sub-signals representing portions of a single data stream and being devoid of a spreading signal to respective antennas located at a plurality of signal transmission sites at k−v different positions in a cell with k≧2, wherein v is a number of virtual sites, and transmitting the different sub-signals from the antennas.

28. A method for cellular communication, comprising the steps of:

transmitting m respectively different signals having the same carrier frequency in a cell of a cellular communication system from a plurality of transmitting antennas located at k−v different positions in the cell, wherein v is a number of virtual sites, each of the signals representing a data signal devoid of a spreading signal, at least one of the k−v positions having at least two of the transmitting antennas, receiving the m signals transmitted at the same carrier frequency at a receiving unit having at least two antennas, and converting the received signals into an output signal.

29. A method for cellular communication, comprising the steps of transmitting m respectively different signals having the same carrier frequency in a cell of a cellular communication system from a plurality of transmitting antennas located at a transmitting unit in the cell, each of the signals representing a data signal devoid of a spreading signal, receiving, at a plurality of receiving antennas located at the k−v different positions in the cell, the transmitted signals, wherein v is a number of virtual sites, and combining the transmitted signals to produce an output signal.

* * * * *